United States Patent
Hauber et al.

(10) Patent No.: US 9,434,361 B2
(45) Date of Patent: Sep. 6, 2016

(54) METHOD FOR ACTUATING AN AUTOMATIC PARKING BRAKE

(71) Applicant: Robert Bosch GmbH, Stuttgart (DE)

(72) Inventors: Simon Hauber, Freiberg Am Neckar (DE); Helmut Wolff, Heilbronn (DE)

(73) Assignee: Robert Bosch GmbH, Stuttgart, DE (US)

( * ) Notice: Subject to any disclaimer, the term of this patent is extended or adjusted under 35 U.S.C. 154(b) by 37 days.

(21) Appl. No.: 14/615,112

(22) Filed: Feb. 5, 2015

(65) Prior Publication Data

US 2015/0217737 A1   Aug. 6, 2015

(30) Foreign Application Priority Data

Feb. 6, 2014   (DE) .......................... 10 2014 202 178

(51) Int. Cl.

| | | |
|---|---|---|
| *B60T 8/17* | (2006.01) | |
| *B60T 8/172* | (2006.01) | |
| *F16D 65/18* | (2006.01) | |
| *B60T 13/58* | (2006.01) | |
| *B60T 13/74* | (2006.01) | |
| *F16D 121/24* | (2012.01) | |
| *F16D 121/26* | (2012.01) | |
| *F16D 125/40* | (2012.01) | |
| *F16D 121/02* | (2012.01) | |

(52) U.S. Cl.
CPC . *B60T 8/17* (2013.01); *B60T 8/172* (2013.01); *B60T 13/588* (2013.01); *B60T 13/741* (2013.01); *F16D 65/18* (2013.01); *F16D 2121/02* (2013.01); *F16D 2121/24* (2013.01); *F16D 2121/26* (2013.01); *F16D 2125/40* (2013.01)

(58) Field of Classification Search
CPC ....... B60T 13/588; B60T 13/741; B60T 8/17; B60T 8/172; F16D 2121/02; F16D 2125/40; F16D 65/18; F16D 2121/24; F16D 2121/26
See application file for complete search history.

(56) References Cited

U.S. PATENT DOCUMENTS

| | | | |
|---|---|---|---|
| 2007/0164602 A1* | 7/2007 | Haffelder et al. ................. | 303/3 |
| 2012/0245815 A1* | 9/2012 | Schneider et al. .............. | 701/70 |
| 2013/0226426 A1* | 8/2013 | Baehrle-Miller ..... B60T 13/588 | 701/70 |

FOREIGN PATENT DOCUMENTS

| | | |
|---|---|---|
| DE | 10 2004 046 871 A1 | 7/2005 |
| DE | 10 2011 004 763 A1 | 8/2012 |

* cited by examiner

*Primary Examiner* — Mary Cheung
*Assistant Examiner* — Yuen Wong
(74) *Attorney, Agent, or Firm* — Maginot, Moore & Beck LLP

(57) ABSTRACT

A method for releasing a brake device for an automatic parking brake, a corresponding device, and a control device enable safely releasing the parking brake without stress on components. A method for actuating a parking brake with a brake device having a brake caliper housing with a chamber configured to receive a fluid, a brake piston, a spindle and a spindle nut, includes determining a first hydraulic driver-applied pre-pressure in the chamber during a mechanical application process of the parking brake. The method further includes comparing the first driver-applied pre-pressure to a predetermined pressure threshold value via the control device; and building up a hydraulic support pressure in the chamber in order to unload the spindle when the first driver-applied pre-pressure is above the pressure threshold value.

11 Claims, 2 Drawing Sheets

METHOD FOR ACTUATING AN AUTOMATIC PARKING BRAKE

This application claims priority under 35 U.S.C. §119 to patent application no. DE 10 2014 202 178.2, filed on Feb. 6, 2014 in Germany, the disclosure of which is incorporated herein by reference in its entirety.

The present disclosure relates to a method for actuating an automatic parking brake, to a corresponding automatic parking brake and to a control device.

BACKGROUND

A method for releasing a parking brake, whereby a hydraulic fluid is fed into the hydraulic chamber in principle in the first step, is known from DE 10 2004 046 871 A1. The electric motor is then energized in such a way that it attempts to move the spindle nut of the brake device away from the brake disk. However, as a large spring force acts on the spindle via a spring element and a corresponding auxiliary piston, the electric motor does not at first succeed in moving the spindle. Only when the pressure in the hydraulic chamber is greater than the spring force of the spring element acting via the auxiliary piston is the spindle unloaded and begins to rotate. To prevent the spindle from jamming, a ball is provided on the head of the spindle in order to keep friction as low as possible. In addition, a stop comprising a first and a second element may also be provided to prevent jamming of the spindle, the first element being arranged on the head of the spindle and the second element on a housing part of the parking brake. Such design measures for preventing jamming of the spindle are, however, complex and costly as well as liable to failure.

A release process for a parking brake is further described in DE 10 2011 004 763 A1, whereby the electric brake motors of the two electromechanical brake devices, which together form the parking brake and are each installed on a respective wheel of a common axle, are first activated in the release device, so that the pressure of the brake pistons on the brake disk is reduced and the clamping force is decreased. As soon as a fault is detected during the release, both electric brake motors of the parking brake are switched off. After the electric brake motors have been switched off a maximum braking pressure is then built up automatically via the hydraulic vehicle brake and acts on the brake disks via the same brake pistons which are also subjected to pressure by the electric brake motors. A sufficient clamping force for securely locking the vehicle is thereby to be ensured. A recalibration is then carried out.

Automatic parking brake systems, or automatic "motor on caliper" parking brake systems, which are combined with electronic stability program (ESP) systems, are also known. These systems have at least one electromechanical actuator on the rear wheel brake, a spindle driven by a motor-transmission unit being located in the piston of the service brake. By rotation of the spindle a spindle nut guided in the brake piston is displaced, whereby the brake piston is also displaced. The clamping force on the rear axle can therefore be exerted either mechanically, hydraulically or in a combined manner. In commercially available systems a permanently energized DC motor is generally used to drive the electromechanical actuator.

However, in the event of a superposition of pressures through actuation of the service brake by the driver during actuation of the parking brake, it can happen that the spindle provided in the brake piston, especially when the hydraulic pressure applied by the driver is reduced again with the parking brake engaged, is exposed, on subsequent release without hydraulic pre-pressure, to high longitudinal forces acting via the spindle nut. These forces can cause the spindle 400 to flex elastically, as represented in exaggerated form in FIG. 1, since the spindle acts against the spring force F of the brake caliper (see arrow in FIG. 1: $F_{caliper}=c_{caliper}*s_{piston}$, where $c_{caliper}$ is the spring constant of the brake caliper and $s_{piston}$ the distance travelled by the brake piston). Such flexing of the spindle can have the result that the frictional forces between the threads of the spindle and of the spindle nut increase during opening or release of the automatic parking brake (binding), whereby opening of the automatic parking brake without a corresponding pre-pressure applied by the driver may not be ensured.

It is therefore the object of the present disclosure to provide a method for releasing a brake device for an automatic parking brake, and a corresponding device or a control device, by means of which the parking brake can be released reliably and without stress on components.

SUMMARY

This object is achieved by the features of the claims of the present disclosure. Developments are specified in the claims, the drawings, and the present disclosure.

The method for actuating a parking brake with a brake device including a brake caliper housing with a chamber for receiving a fluid, a brake piston, a spindle and a spindle nut advantageously comprises the following steps: determining a first driver-applied hydraulic pre-pressure in the chamber during a mechanical application process of the parking brake; comparing the first driver-applied pre-pressure to a predetermined pressure threshold value (limit value—force/area) by means of a control device; and building up a hydraulic support pressure in the chamber (during release of the parking brake) in order to unload the spindle, if the first driver-applied pre-pressure is above the pressure threshold value. According to the present disclosure, therefore, if a certain hydraulic pre-pressure has been exerted by the driver via the service brake during actuation of the parking brake, the release process of the parking brake is supported hydraulically, for example by means of an ESP modulator. In this way the mechanical subsystem consisting of the spindle and the spindle nut is unloaded, since the brake piston is again displaced hydraulically in the direction of the brake disk. In this way an elastic deformation or flexing of the spindle can be counteracted during the release process of the parking brake. If the driver-applied pre-pressure is below the pressure threshold value, no such support is needed, reducing stress on components, in particular with regard to the hydraulic device (ESP modulator).

The method advantageously includes the following further step: determining a second hydraulic driver-applied pre-pressure in the chamber at the start of a release process of the parking brake, the hydraulic support pressure in the chamber (23) for unloading the spindle (4) being built up only if the difference between the first driver-applied pre-pressure and the second driver-applied pre-pressure is greater than the pressure threshold value. It is thereby achieved that if, for example, a very high first driver-applied pre-pressure was present and the second driver-applied pre-pressure is above the pressure threshold value, a hydraulic pressure support nevertheless takes place if the difference between the first driver-applied pre-pressure and the second driver-applied pre-pressure is greater than the pressure threshold value, in order in this way to effect an unloading of the spindle.

The hydraulic support pressure in the chamber advantageously takes place adaptively during the release as a function of the difference determined between the first driver-applied pre-pressure and the second driver-applied pre-pressure. In this way the spindle can be unloaded optimally in that, for example, the hydraulic support pressure corresponds exactly to the difference between the first and the second driver-applied pre-pressures.

The hydraulic support pressure in the chamber during the release advantageously takes place adaptively as a function of the difference between the difference determined between the first driver-applied pre-pressure and the second driver-applied pre-pressure, and the pressure threshold value.

The hydraulic pressure support in the chamber is advantageously enabled for the following release process if the first driver-applied pre-pressure is above the pressure threshold value. In this way a two-stage system, whereby a hydraulic pressure support takes place only when required, is implemented.

The first driver-applied pre-pressure is advantageously measured during the mechanical application process of the parking brake and is stored by means of a storage device; only thereby is corresponding data-processing made possible.

The predetermined pressure threshold value is advantageously calculated from characteristic values, such as the brake piston diameter, the stiffness of the brake caliper housing and of the spindle of the parking brake, together with an additional safety margin, whereby trouble-free operation of the brake system is made possible.

The first driver-applied pre-pressure and the second driver-applied pre-pressure are advantageously determined in an analog manner by at least one pressure sensor. Through the use of the same measuring method and the same pressure sensor the measured values are suitably robust.

A suitable control and regulation device and a corresponding brake device are provided for implementing the method.

BRIEF DESCRIPTION OF THE DRAWINGS

Further features and utilities of the disclosure are apparent from the description of exemplary embodiments with reference to the appended figures, in which.

DETAILED DESCRIPTION

Figure 2:
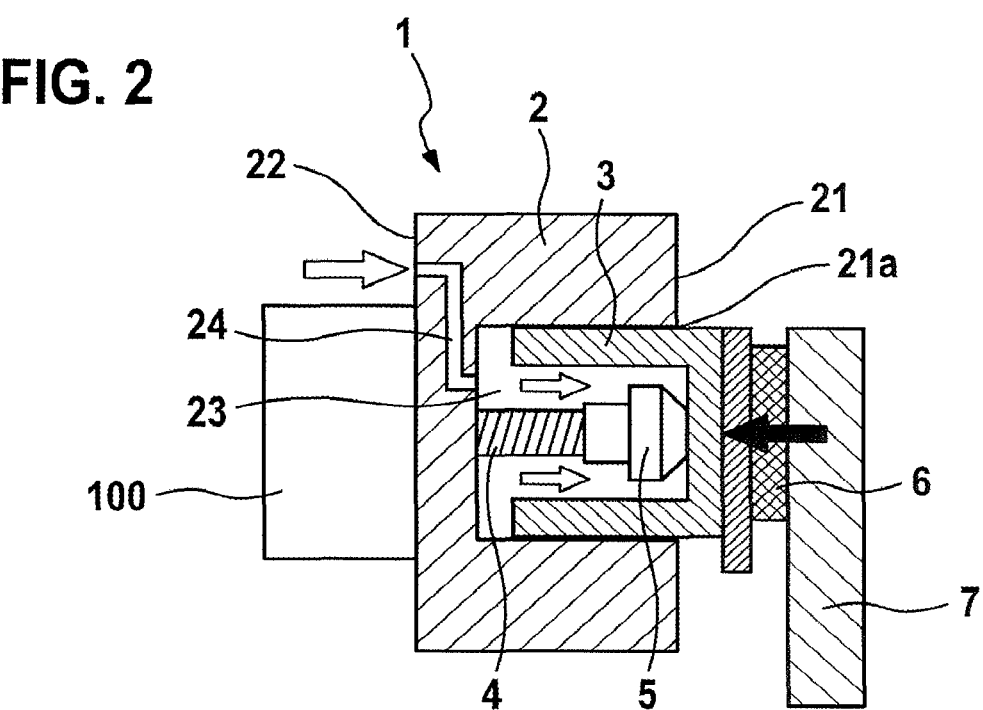
FIG. 2 is a schematic representation of the brake device according to an embodiment of the present disclosure.

A first embodiment of the present disclosure is described below with reference to FIG. 2. A brake device 1 for an automatic (automated) parking brake (or locking brake) comprises a brake caliper housing 2 or a brake caliper, a brake piston 3, a spindle 4, in particular a threaded spindle, and a spindle nut 5. The parking brake further has a motor-transmission unit (MGU) 100, at least one brake pad 6 on the brake piston side, and a brake disk 7.

The brake caliper housing 2 comprises a first end 21 with a first opening 21a for receiving the brake piston 3, a second end 22 oriented in the direction of the motor-transmission unit 100, and a chamber 23 for receiving a fluid or a brake fluid. A hydraulic line 24 for conducting the brake fluid into/out of the chamber 21 is further provided in the brake caliper housing 2.

The brake piston 3 is substantially cylindrical and has a blind hole oriented in the direction of the second end 22, in which blind hole the spindle 4 and the spindle nut 5 mounted thereon are provided. In this case the brake device 1 is configured such that the brake piston 3 either is moved hydraulically in the direction of the brake disk 7, or this process is performed mechanically via the spindle 4 and the spindle nut 5, or a combination thereof is used.

In operation the brake device 1 for the parking brake according to the disclosure is operated as follows. Vehicles, in particular motor vehicles equipped with ESP, offer the possibility of modulating the braking pressure in a wheel-individual manner. The present brake device 1, or the parking brake, is equipped with at least one pressure sensor (not shown), so that, upon actuation of the parking brake, any driver-applied pre-pressure present, that is, the pre-pressure exerted by the driver via the service brake (not shown) of the vehicle, can be measured. In the application phase of the automatic parking brake the driver-applied pre-pressure can therefore be determined and stored by means of a suitable storage device (not shown). As soon as it is detected by means of a suitable control device (not shown) that the driver-applied pre-pressure is above a predetermined pressure threshold value, a hydraulic support may be effected preventively during a subsequent release process of the automatic parking brake in order to unload the spindle 4 mechanically. The hydraulic support may be implemented by means of a suitable hydraulic unit (ESP modulator).

Figure 3:
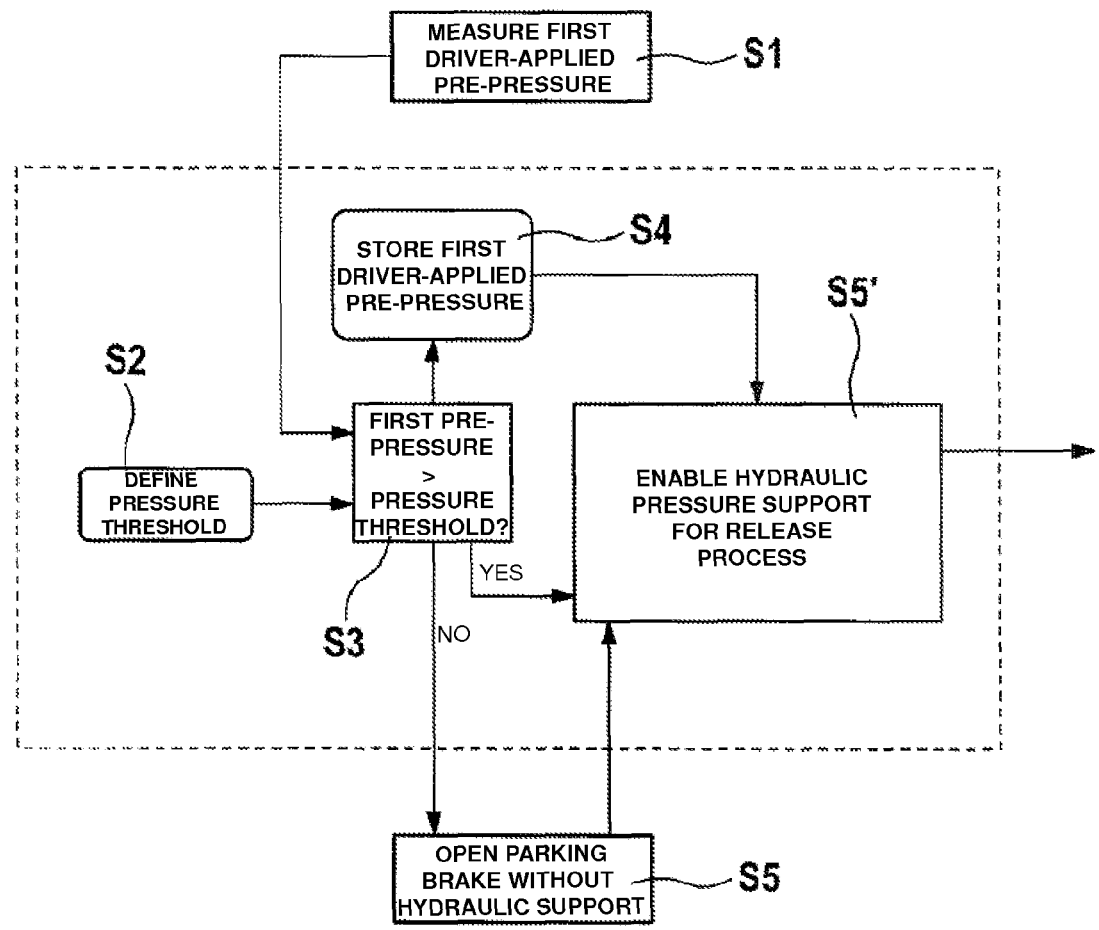
FIG. 3 is a functional flow diagram of the method according to the embodiment of the disclosure.

With reference to FIG. 3, The functional sequence of operating the parking brake can be divided into the following steps:

First, in the application phase, that is, during actuation of the parking brake, a first driver-applied pre-pressure in the chamber 23 of the brake caliper housing 2, exerted via the service brake and via the hydraulic line 24, is measured (S1).

A pressure threshold value is or has been defined (S2) and is selected such that, when it is exceeded, there is at least a danger that the spindle 4 jams during release on account of excessive elastic deformation (flexing), or at least a certain binding of the system occurs on account of the increased frictional forces arising as a result of the flexing of the spindle 5, in particular with regard to the threaded connection between the spindle 4 and the spindle nut 5, which in the worst case leads to an unreleasable parking brake or to damage to components. The pressure threshold value is dependent on the characteristic curve of the mechanical components involved. This includes, for example, parameters such as the brake piston diameter, the stiffness of the brake caliper, of the spindle 4, of the brake piston 3, etc., which stiffness depends on the respective geometry and the material used, and the properties of the threaded connection between the spindle 4 and the spindle nut 5. An additional safety margin may also be included.

It is determined by means of a suitable control unit whether the first measured driver-applied pre-pressure is above the defined pressure threshold value (S3). If the first driver-applied pre-pressure is above the defined pressure threshold value, a hydraulic pressure support for the following release process is enabled (S5'). That is, a pressure support during the following release process is possible but not mandatory. If the first driver-applied pre-pressure is below the defined pressure threshold value, the parking brake is opened without hydraulic support (S5), since it must be assumed that the longitudinal forces arising, which act on the spindle 4, are small and therefore do not adversely influence the operation or the release process of the parking brake.

The first driver-applied pre-pressure is stored by the storage device (S4).

At the start of the release process a second driver-applied pre-pressure is measured in order to check via the control unit whether a hydraulic support (which may be enabled) is required or not, and with which pressure it should be carried out. What is relevant here is the difference between the first driver-applied pre-pressure measured during application of the parking brake and the second driver-applied pre-pressure measured again at the start of the release process, if the second driver-applied pre-pressure at the start of the release process is lower than the first driver-applied pre-pressure during closing of the parking brake. If this difference at the start of the release process of the automatic parking brake is below the pressure threshold value, or the driver-applied pre-pressure at the start of the release process is higher than during the closing of the parking brake—if, therefore, the differential value is, so to speak, negative—the parking brake is opened without hydraulic support (S5).

If the difference at the start of the release process of the automatic parking brake is above the pressure threshold value, a hydraulic support takes place via a corresponding return pump (not shown) of the hydraulic unit (not shown) in order to unload the spindle 4 mechanically.

The hydraulic support during the release can be set adaptively, in particular as a function of the difference determined between the two driver-applied pre-pressures measured. For example, a hydraulic pressure support equal to the pressure difference determined may be carried out. However, the hydraulic support pressure in the chamber during the release may also take place adaptively as a function of the difference between the difference determined between the first driver-applied pre-pressure and the second driver-applied pre-pressure, and the pressure threshold value. It is ensured by means of the additional safety margin that the amount of the support pressure is not selected merely such that a pressure difference finally remains at the level of the pressure threshold value, but that a smaller pressure difference is produced. Jamming of the spindle 4 is thereby reliably prevented.

Figure 1:
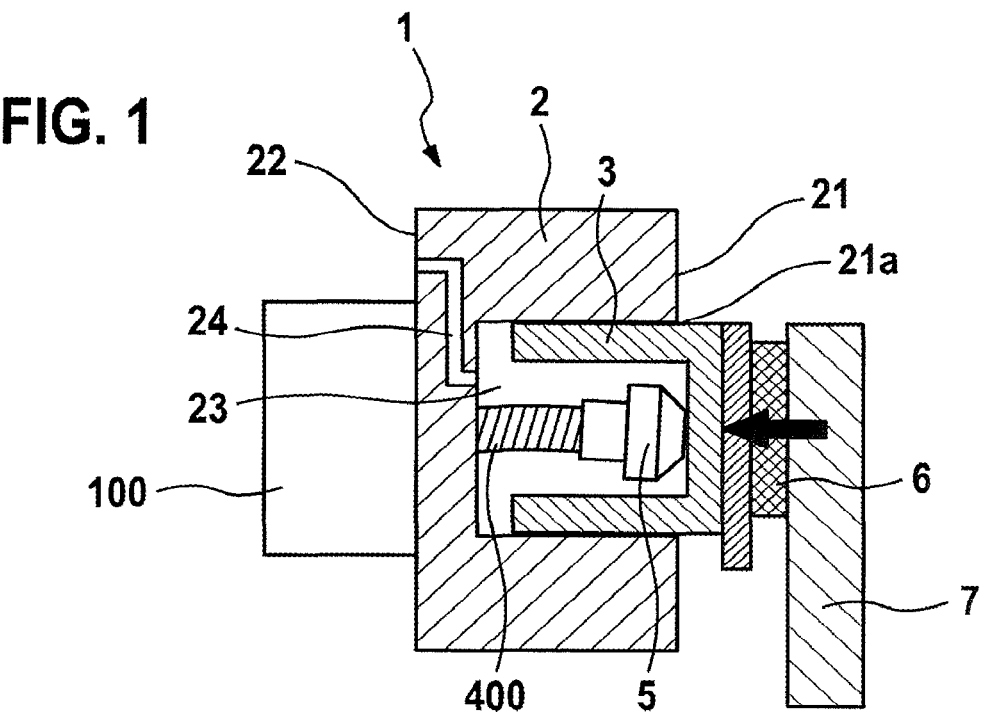
FIG. 1 is a schematic representation of a conventional brake device with flexing spindle.

In the extreme case that a very high first driver-applied pre-pressure has been exerted during actuation of the parking brake, the second driver-applied pre-pressure then having been reduced to zero prior to the release process of the parking brake, so that the chamber 23 of the brake caliper housing 2 is substantially unpressurized, large longitudinal forces (indicated in FIG. 1 by the arrow from right to left) act via the brake piston 3 and the spindle nut 5 on the spindle 4, whereby the spindle 4 is deformed elastically, as shown in FIG. 1.

By means of the method according to the disclosure a hydraulic support pressure is built up if required in the chamber 23 via the hydraulic line 24 and the ESP modulator, which support pressure presses the brake piston 3 in the direction of the brake disk 7, thus unloading the spindle nut 5 and the spindle 4. The hydraulic forces generated in this way (indicated in FIG. 2 by the three arrows from left to right) counteract or cancel out the above-mentioned longitudinal forces. In this way the parking brake can be released with a minimized elastic deformation of the spindle 5.

What is claimed is:

1. A method of actuating a parking brake with a brake device that includes a brake caliper housing that defines a chamber configured to receive a fluid, a brake piston, a spindle, and a spindle nut, the method comprising:
    determining a first hydraulic driver-applied pre-pressure in the chamber during a mechanical application process of the parking brake;
    comparing the first hydraulic driver-applied pre-pressure to a first predetermined pressure threshold value via a control device; and
    when the first hydraulic driver-applied pre-pressure is above the first pressure threshold value, building up a hydraulic support pressure in the chamber that is configured to unload the spindle.

2. The method according to claim 1, the method further comprising:
    at a start of a release process of the parking brake, determining a second hydraulic driver-applied pre-pressure in the chamber; and
    only building up of the hydraulic support pressure in the chamber when a difference between the first hydraulic driver-applied pre-pressure and the second hydraulic driver-applied pre-pressure is greater than a second pressure threshold value.

3. The method according to claim 2, wherein the second pressure threshold value is equivalent to or substantially equivalent to the first pressure threshold value.

4. The method according to claim 2, wherein the buildup of hydraulic support pressure in the chamber takes place adaptively during the release process as a function of the difference between the first hydraulic driver-applied pre-pressure and the second hydraulic driver-applied pre-pressure.

5. The method according to claim 2, wherein the buildup of hydraulic support pressure in the chamber takes place adaptively during the release process as a function of (i) the difference between the first hydraulic driver-applied pre-pressure and the second hydraulic driver-applied pre-pressure, and (ii) the first pressure threshold value.

6. The method according to claim 2, further comprising:
    determining the first hydraulic driver-applied pre-pressure and the second hydraulic driver-applied pre-pressure in an analog manner via at least one pressure sensor.

7. The method according to claim 1, further comprising:
    when the first hydraulic driver-applied pre-pressure is above the first pressure threshold value, enabling the hydraulic support pressure in the chamber for a following release process.

8. The method according to claim 1, further comprising:
    measuring the first hydraulic driver-applied pre-pressure during the mechanical application process of the parking brake; and
    storing a measured value of the first hydraulic driver-applied pre-pressure in a storage device.

9. The method according to claim 1, further comprising:
    calculating the first pressure threshold value with reference to at least one characteristic value and an additional safety margin, the at least one characteristic value including at least one of (i) a diameter of the brake piston, (ii) a stiffness of the brake caliper housing, and (iii) a stiffness of the spindle.

10. A brake device for an automotive parking brake, comprising:
    a brake caliper housing that defines a chamber configured to receive a fluid;
    a brake disk;
    a brake piston positioned and arranged in the brake caliper housing so as to be axially displaceable along an axis to enable the brake piston to cooperate with the brake disk;
    a spindle received in the brake piston;
    a spindle nut that is received in the brake piston, that cooperates with the spindle to enable the spindle to move axially along the axis in response to rotation of the spindle, and that is configured and arranged to come into contact with the brake piston;

wherein, when a first hydraulic driver-applied pre-pressure is above a first pressure threshold value during a mechanical application process of the parking brake, the brake device is configured to build up a hydraulic support pressure in the chamber that is configured to unload the spindle.

11. A control device configured to actuate a parking brake with a brake device that includes a brake caliper housing that defines a chamber configured to receive a fluid, a brake piston, a spindle, and a spindle nut, the actuating of the parking brake comprising:

determining a first hydraulic driver-applied pre-pressure in the chamber during a mechanical application process of the parking brake;

comparing the first hydraulic driver-applied pre-pressure to a first predetermined pressure threshold value; and when the first hydraulic driver-applied pre-pressure is above the first pressure threshold value, building up a hydraulic support pressure in the chamber that is configured to unload the spindle.

* * * * *